(12) United States Patent
Horn, III et al.

(10) Patent No.: US 6,189,647 B1
(45) Date of Patent: Feb. 20, 2001

(54) ANTI-THEFT STEERING WHEEL FOR VEHICLES

(76) Inventors: William S. Horn, III, 14114248 Vanetta Dr., Studio City, CA (US) 91604; Richard B. Lee, 18202 Trace Forest Dr., Spring, TX (US) 77379

( * ) Notice: Under 35 U.S.C. 154(b), the term of this patent shall be extended for 0 days.

(21) Appl. No.: 09/407,932

(22) Filed: Sep. 28, 1999

(51) Int. Cl.[7] ...................................................... B60R 2/02
(52) U.S. Cl. ................................ 180/287; 70/209; 70/237
(58) Field of Search ............................ 180/287; 70/209, 70/226, 237

(56) References Cited

U.S. PATENT DOCUMENTS

| | | | |
|---|---|---|---|
| 5,031,429 | * 7/1991 | Wang | 70/209 |
| 5,409,077 | * 4/1995 | Ball | 180/287 |
| 5,557,957 | * 9/1996 | Wyman | 180/287 |
| 5,653,132 | * 8/1997 | Coto | 70/209 |
| 6,006,851 | * 12/1999 | Brown | 180/287 |

* cited by examiner

Primary Examiner—Peter C. English
(74) Attorney, Agent, or Firm—Kenneth A. Roddy

(57) ABSTRACT

An anti-theft steering wheel has a box-like housing in its central transverse hub portion disposed below the plane of the surrounding annular steering wheel ring portion. The housing is secured to the steering shaft upper end to rotate therewith and has a pair of parallel spaced longitudinal tubular passageways. A pair of metal security rods telescopically mounted in the tubular passageways are movable between a fully retracted position within the tubular passageways and a fully extended position extending radially outward from laterally opposed sides of the steering wheel central transverse hub portion a sufficient distance beyond the annular ring portion to obstruct and prevent effective rotation of the steering wheel. A security rod release button protruding from the rear of the central hub portion simultaneously moves a pair of spring biased detent pins in the housing between a latched position engaged with the security rods to maintain the rods in the fully retracted position and an unlatched position disengaged from the security rods. A pair of latch members connected with a key lock are movable between a latched position engaged with the security rods to maintain the rods in the fully extended position and an unlatched position disengaged therefrom to allow retraction thereof. The key lock has a key receiving portion on the front of the steering wheel for receiving a key that moves the latch members to their unlatched position to allow retraction of the security rods.

14 Claims, 7 Drawing Sheets

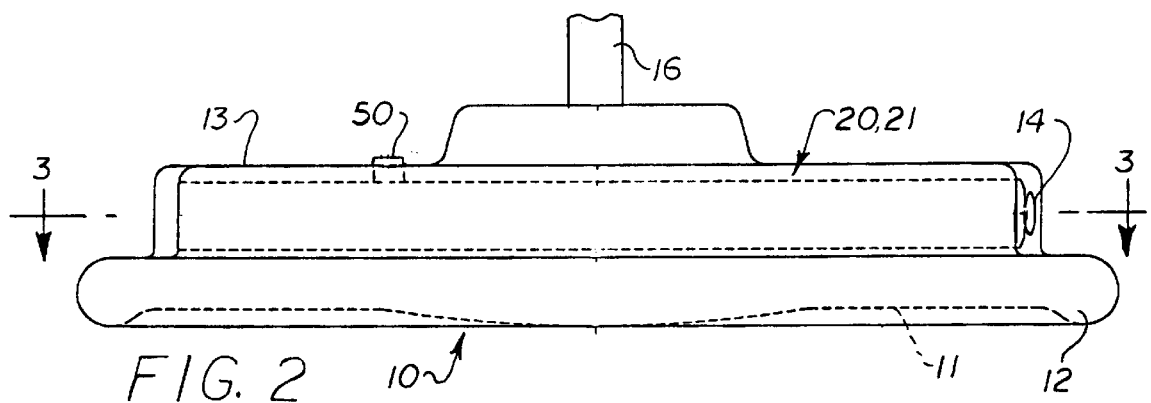
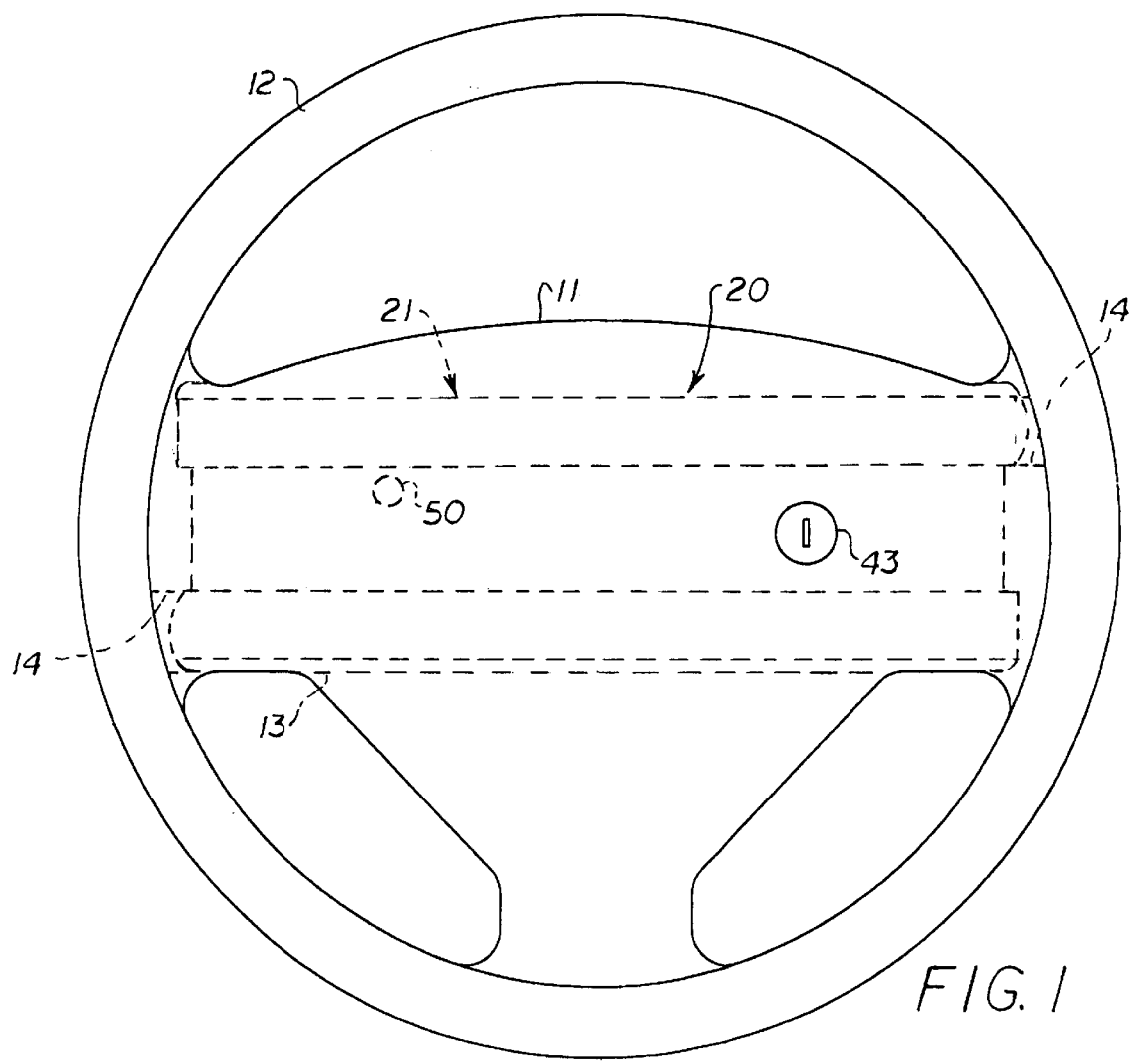

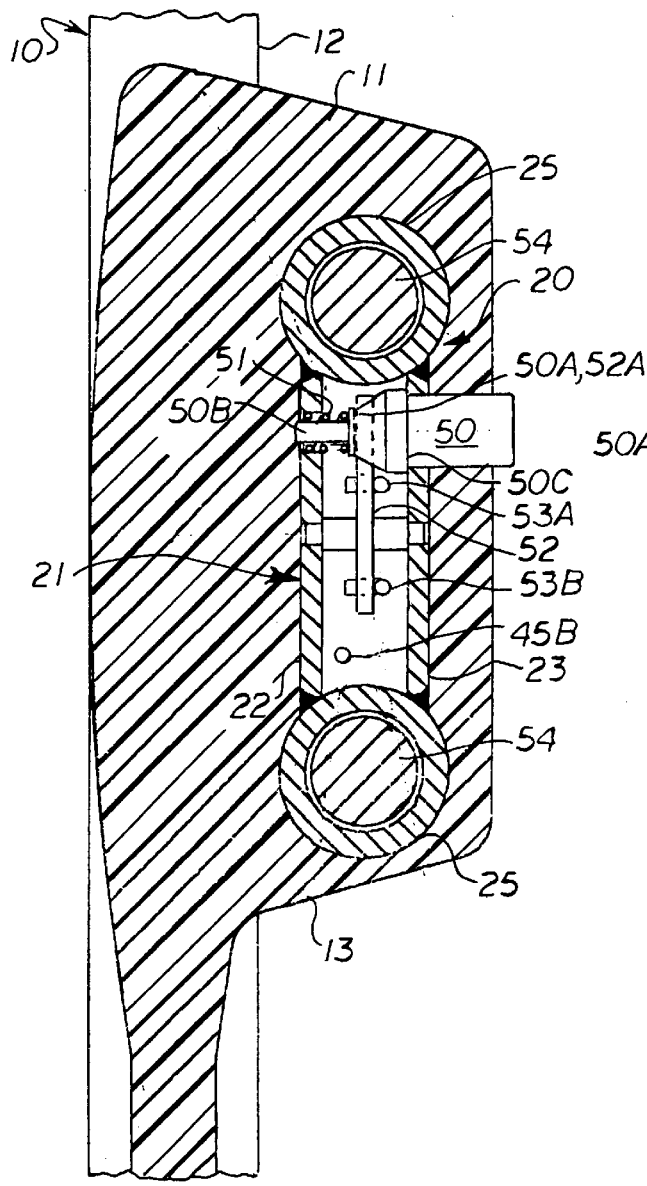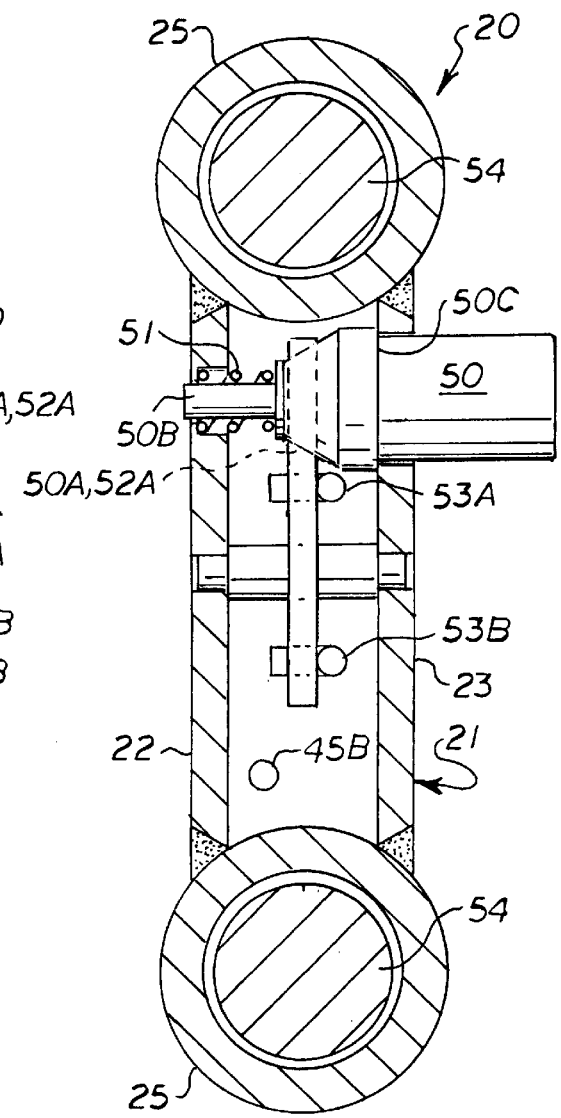
FIG. 7
FIG. 8

ANTI-THEFT STEERING WHEEL FOR VEHICLES

BACKGROUND OF THE INVENTION

1. Field of the Invention

This invention relates generally to steering wheel vehicle anti-theft devices, and more particularly to an anti-theft steering wheel for vehicles that prevents the steering wheel from being turned and also prevents access to the steering wheel attachment nut to prevent steering even if the steering wheel is destroyed.

2. Brief Description of the Prior Art

There are several patents that disclose various steering wheel locking apparatus having rods. However, none of these have the housing of an anti-theft device molded into the central transverse hub portion of the steering wheel below the plane of the steering wheel ring portion wherein the housing is secured to the upper end of the steering shaft and encloses the steering wheel attachment nut. The present anti-theft steering wheel not only has extendible rods to prevent the steering wheel from being turned but also prevents access to the steering wheel attachment nut to prevent steering even if the steering wheel is cut or destroyed.

Coto, U.S. Pat. No. 5,653,132, discloses a steering wheel locking apparatus having an extendible rod that is slidably mounted in a tubular spoke that is integral with a side of the rectangular horn or airbag housing assembly of the steering wheel. In one embodiment the rod has a plurality of spaced apart annular recesses on its inward facing end. In another embodiment the rod has a link chain with plurality of spaced links at its inward facing end. A rotatable latch of a key lock mounted on the spoke engages a selected recess or chain link to lock the rod in a retracted or extended position. The spokes, rod, and chain are offset from the center of the horn or airbag housing.

Wyman, U.S. Pat. No. 5,557,957, discloses an electronically activated steering wheel anti-theft apparatus having a pair of extendible rods that are built into the transverse body of the steering wheel. An electric switch connected with the steering column ignition switch controls electronic latches that allow the rods to be retracted only when the ignition switch is turned on.

Ball, U.S. Pat. No. 5,409,077, discloses a steering wheel anti-theft apparatus having a single extendible rod that is slidably mounted in a bore extending through a pair of axially aligned spokes of a spoked steering wheel. The rod has a pair of spaced apart notches. A rotatable pin portion of a key lock mounted on the spoke engages the first notch on the rod to maintain the rod in a retracted position and engages the second notch to maintain the rod in its extended position.

Anderson, U.S. Pat. No. 5,353,614, discloses a flat circular cover with a peripheral lip that is secured over the steering wheel and has a wheel locking apparatus with an extendible rod mounted on the face of the cover. The rod has a knuckled section on its inward facing end that is slidably received through a key lock mounted on the face of the cover. The lock engages the knuckled section to lock the rod in an extended position.

Wang, U.S. Pat. No. 5,031,429, discloses a steering wheel locking device having a single extendible rod that is slidably mounted in a tube disposed in a trough integrally formed in the underside of the transverse rib of the steering wheel. The rod has a pair of spaced apart grooves. A rotatable latch of a key lock mounted on the top side of the rib engages the first groove on the rod to maintain the rod in a retracted position and engages the second groove to maintain the rod in its extended position. Alternatively, the trough, tube and rod may be mounted in the rib or on top of the rib. The trough, tube, and rod are offset from the steering wheel attachment nut so as not to interfere with installing the steering wheel on the steering column.

The present invention is distinguished over the prior art in general, and these patents in particular, by an anti-theft steering wheel having a box-like housing in its central transverse hub portion disposed below the plane of the surrounding annular steering wheel ring portion. The housing is secured to the steering wheel shaft upper end to rotate therewith and has a pair of parallel spaced longitudinal tubular passageways. A pair of metal security rods telescopically mounted in the tubular passageways are movable between a fully retracted position within the tubular passageways and a fully extended position extending radially outward from laterally opposed sides of the steering wheel central transverse hub portion a sufficient distance beyond the annular ring portion to obstruct and prevent effective rotation of the steering wheel. A security rod release button protruding from the rear of the central hub portion simultaneously moves a pair of spring biased detent pins in the housing between a latched position engaged with the security rods to maintain the rods in the fully retracted position and an unlatched position disengaged from the security rods. A pair of latch members connected with a key lock are movable between a latched position engaged with the security rods to maintain the rods in the fully extended position and an unlatched position disengaged therefrom to allow retraction thereof. The key lock has a key receiving portion on the front of the steering wheel for receiving a key that moves the latch members to their unlatched position to allow retraction of the security rods.

SUMMARY OF THE INVENTION

It is therefore an object of the present invention to provide an anti-theft steering wheel for vehicles that prevents the steering wheel from being turned and also prevents access to the steering wheel attachment nut to prevent steering even if the steering wheel is destroyed.

It is another object of this invention to provide a vehicle anti-theft device incorporated into the steering wheel of the vehicle and hidden within the steering wheel and which will not hinder operation of the steering wheel.

Another object of this invention is to provide an anti-theft steering wheel which is secured onto the steering column shaft by a nut which is thereafter completely enclosed to prevent unauthorized access to the steering wheel/steering column connection.

Another object of this invention is to provide an anti-theft steering wheel which has a pair of telescoping security rods movable between a latched retracted position within the steering wheel and a latched and locked radially outward fully extended position.

Another object of this invention is to provide an anti-theft steering wheel having a pair of telescoping security rods movable between a latched retracted position within the steering wheel and a latched and locked position extending radially outward from laterally opposed sides of the steering wheel a sufficient distance to prevent effective rotation of the steering wheel.

A further object of this invention is to provide an anti-theft steering wheel having a pair of telescoping security rods which can be manually moved to a fully extended latched and locked position without requiring a key.

A still further object of this invention is to provide an anti-theft steering wheel which is tamper-resistant, rugged and reliable in operation.

Other objects of the invention will become apparent from time to time throughout the specification and claims as hereinafter related.

The above noted objects and other objects of the invention are accomplished by an anti-theft steering wheel having a box-like housing in its central transverse hub portion disposed below the plane of the surrounding annular steering wheel ring portion. The housing is secured to the steering wheel shaft upper end to rotate therewith and has a pair of parallel spaced longitudinal tubular passageways. A pair of metal security rods telescopically mounted in the tubular passageways are movable between a fully retracted position within the tubular passageways and a fully extended position extending radially outward from laterally opposed sides of the steering wheel central transverse hub portion a sufficient distance beyond the annular ring portion to obstruct and prevent effective rotation of the steering wheel. A security rod release button protruding from the rear of the central hub portion simultaneously moves a pair of spring biased detent pins in the housing between a latched position engaged with the security rods to maintain the rods in the fully retracted position and an unlatched position disengaged from the security rods. A pair of latch members connected with a key lock are movable between a latched position engaged with the security rods to maintain the rods in the fully extended position and an unlatched position disengaged therefrom to allow retraction thereof. The key lock has a key receiving portion on the front of the steering wheel for receiving a key that moves the latch members to their unlatched position to allow retraction of the security rods.

BRIEF DESCRIPTION OF THE DRAWINGS

FIG. 1 is a front elevation view of a steering wheel equipped with the steering wheel anti-theft device in accordance with the present invention.

FIG. 2 is a top plan view of the steering wheel equipped with the steering wheel anti-theft device.

FIG. 7 is a transverse cross section through the anti-theft device taken along line 7—7 of FIG. 3, showing the detent linkage arm and security rod release button mechanisms.

FIG. 8 is an enlarged view of FIG. 7, showing the detent linkage arm and security rod release button mechanisms in greater detail.

DESCRIPTION OF THE PREFERRED EMBODIMENT

Figure 3:
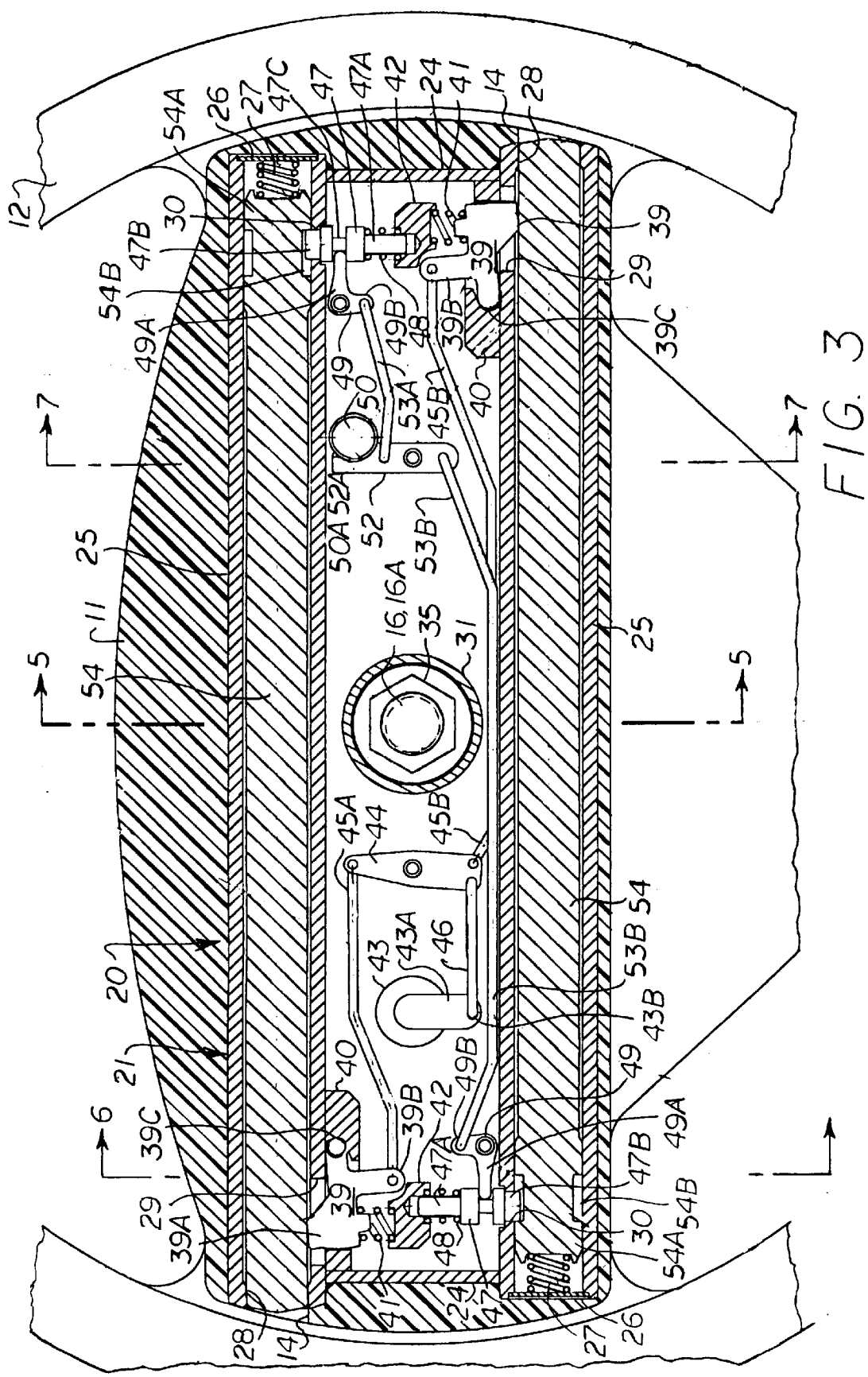
FIG. 3 is a longitudinal cross section through the rear portion of the steering wheel taken along line 3—3 of FIG. 2, looking into the housing of the anti-theft device from the rear and showing the security rods in the fully retracted and stored position.

Referring to the drawings by numerals of reference, there is shown in FIGS. 1 and 2, a vehicle steering wheel 10 equipped with the steering wheel anti-theft device 20, as seen from the front and top, respectively. The steering wheel 10 has a central transverse body portion 11 encircled by an annular ring portion 12.

It should be understood that the central transverse body portion 11 of the steering wheel 10 may be equipped with a conventional airbag assembly and/or horn switch assembly which are well known in the art, and therefore those components are not shown to avoid confusion and to more clearly illustrate the subject matter regarded as the invention. As described hereinafter, the present anti-theft device 20 is disposed in the steering wheel 10 underneath the conventional airbag assembly and/or horn switch assembly.

The central transverse body portion 11 has a rearwardly extending generally rectangular or oval-shaped hub portion 13. In the present invention, the generally rectangular or oval-shaped hub portion 13 of the steering wheel 10 is molded or otherwise formed around the housing 21 of the anti-theft device 20 (described hereinafter) such that the anti-theft device and the steering wheel are substantially an integral unit.

Figure 4:
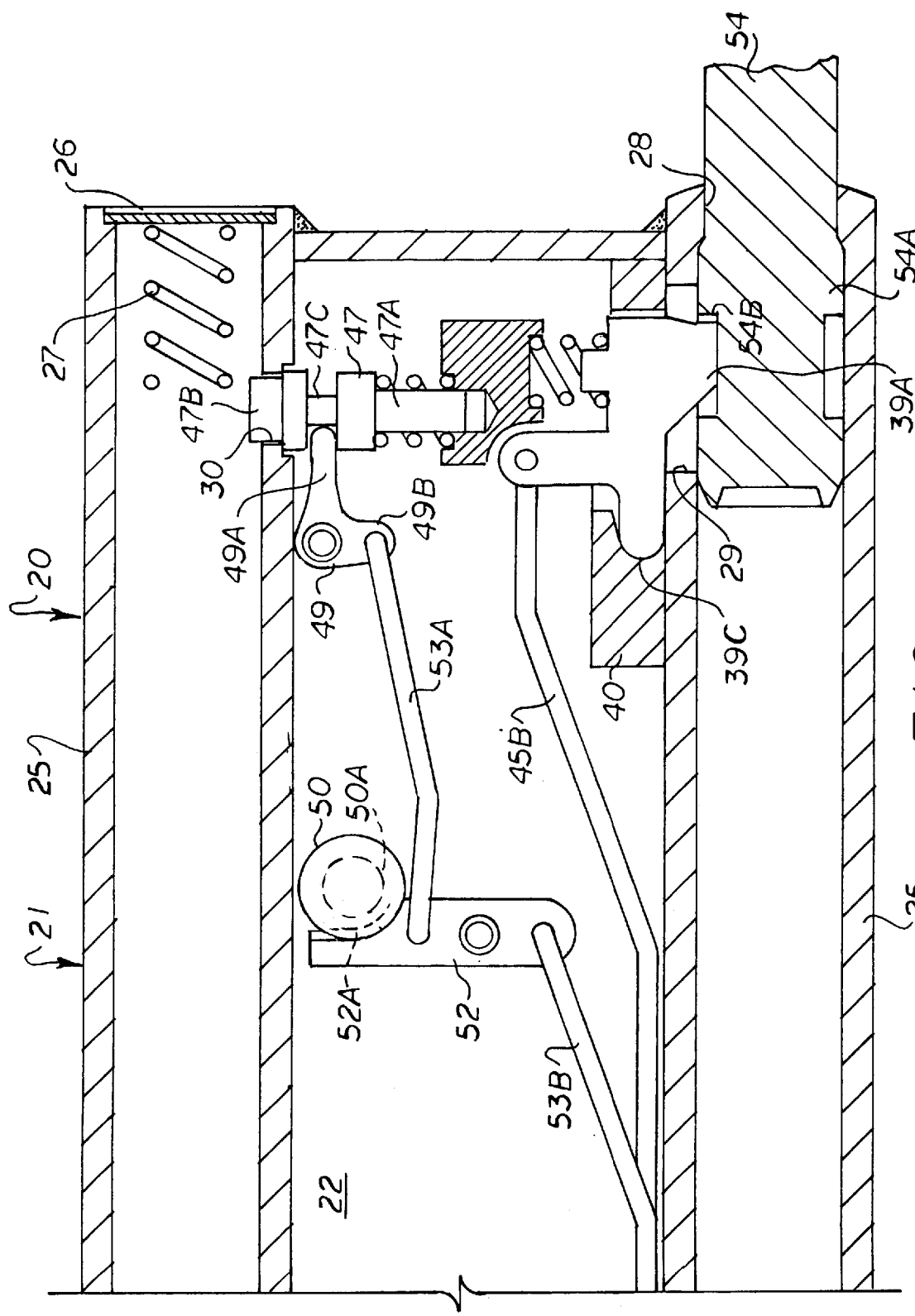
FIG. 4 is an enlarged longitudinal cross section through the rear portion of anti-theft device similar to FIG. 3, but showing one end of the anti-theft device in greater detail with the security rods in the fully extended and latched position.
Figure 9:
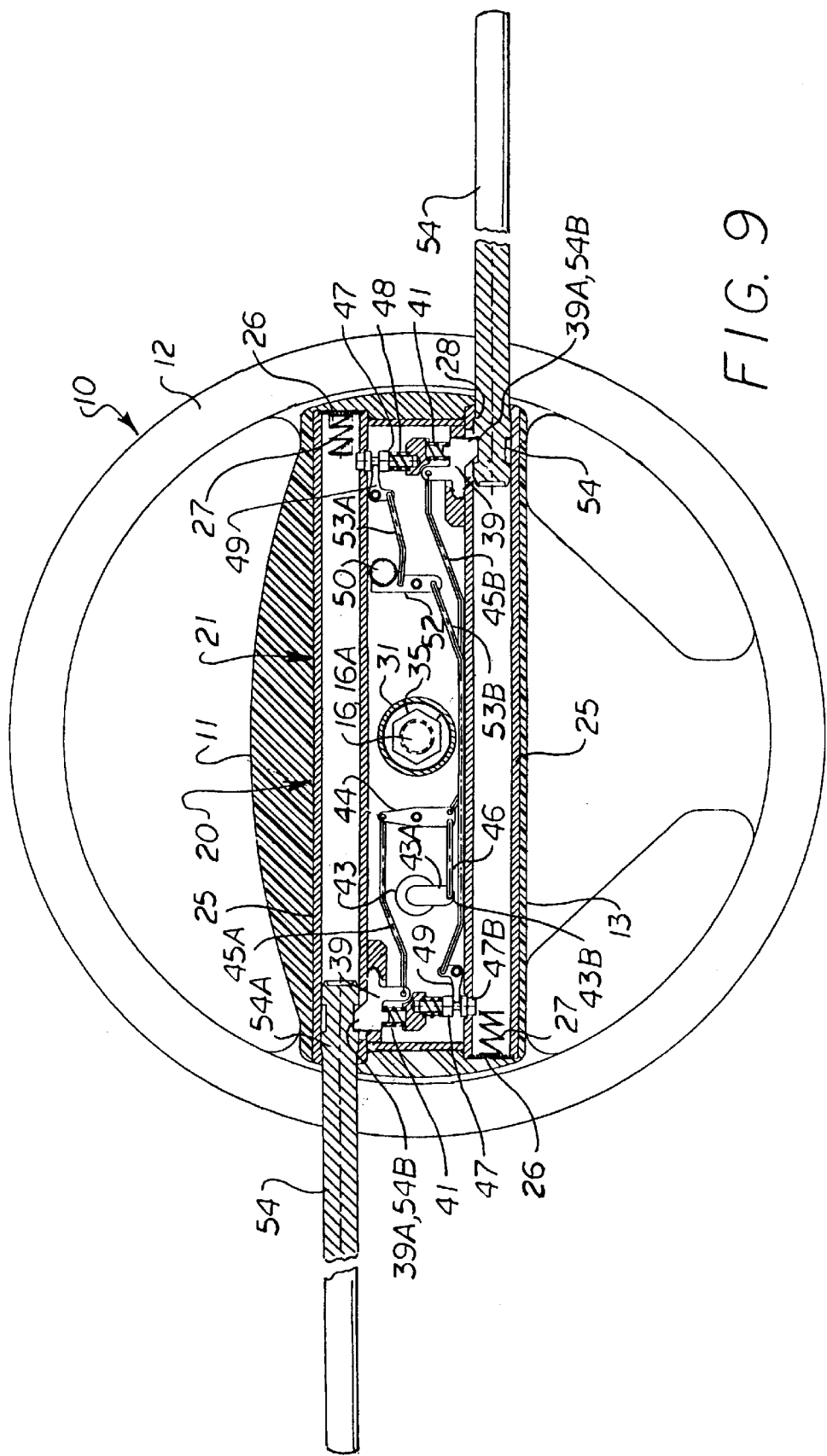
FIG. 9 is a longitudinal cross section through the anti-theft device similar to FIG. 3, but at a smaller scale, showing the security rods in the outwardly extended position.

Referring additionally to FIGS. 3 through 8, the anti-theft device 20 has a generally rectangular housing 21 formed of parallel spaced front and rear plates 22 and 23 enclosed at each end by end plates 24. The opposed longitudinal sides of the housing 21 are enclosed by longitudinal hollow tubes 25. Each tube 25 is enclosed at one end by an end plug 26. A compression spring 27 is secured at one end to each end plug 26 and extends into the interior of each tube 25. Each tube 25 has a reduced diameter bore 28 at one end, a slot 29 through its side wall near the reduced diameter end, and a hole 30 through its side wall near its opposed enclosed end. The slots 29 and holes 30 face the interior of the housing 21. As best seen in FIGS. 3, 4 and 9, the tubes 25 are disposed with their open ends in laterally opposed relation.

Figure 5:
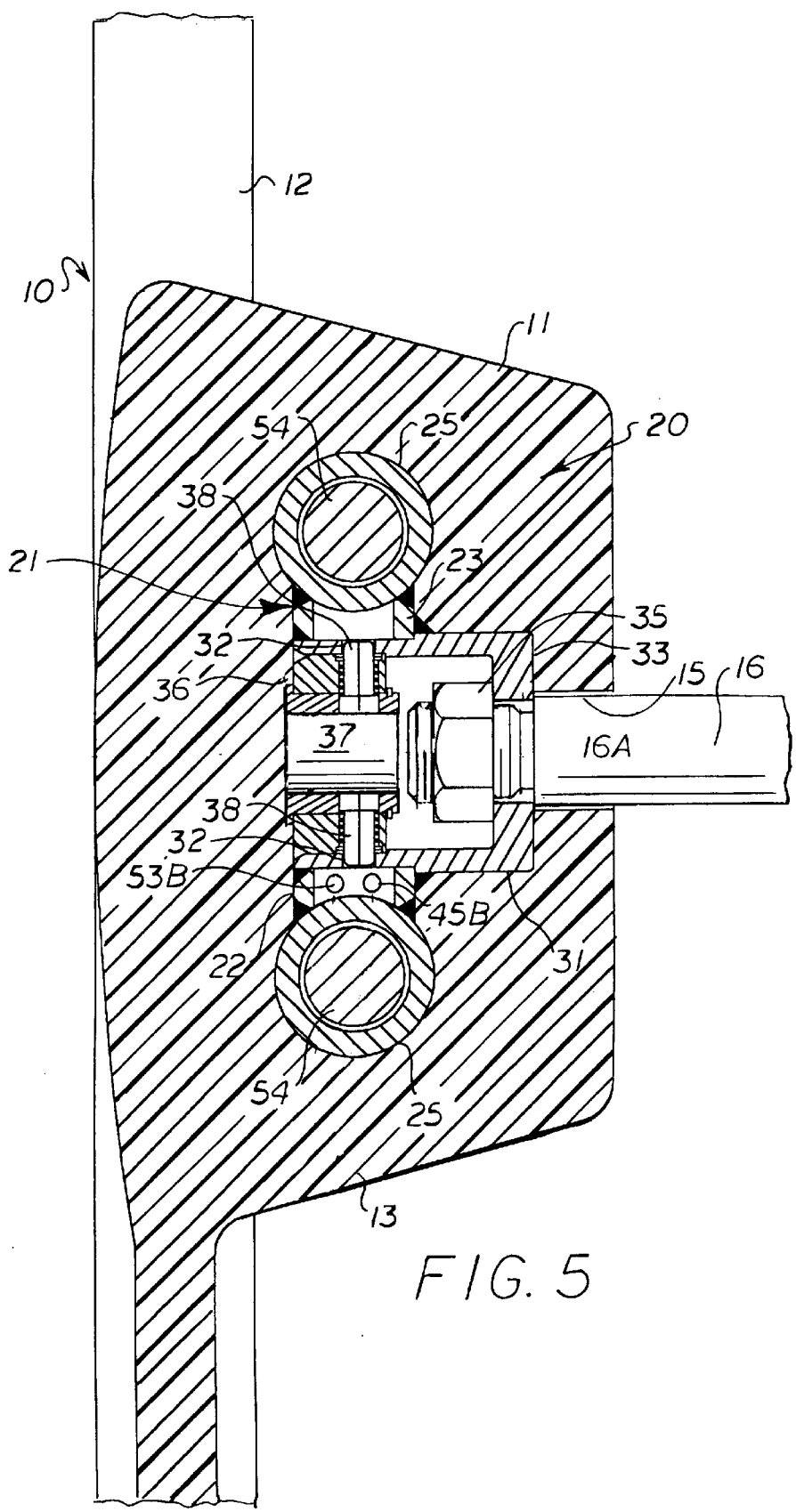
FIG. 5 is transverse cross section through the center of the anti-theft device taken along line 5—5 of FIG. 3, showing the key locked safety plug arrangement enclosing the front end of the steering column shaft and steering wheel attachment nut.

As best seen in FIGS. 3 and 5, a hollow cup-shaped member 31 extends through the center of the parallel spaced front and rear plates 22 and 23 and a distance outwardly from the rear plate 23. The cup-shaped member 31 has circumferentially spaced apertures 32 through its side wall and its outer or rear end is enclosed by a rear wall 33. The rear wall 33 is provided with a central aperture 34. The plates 22, 23, 24, the tubes 25, and the cup-shaped member 31 are all formed of steel and welded together to form a unitary box-like housing.

The generally rectangular or oval shaped hub portion 13 of the central transverse body portion 11 of the steering wheel 10 which is formed around the housing 21 is provided with two apertures 14 through laterally opposed ends, each axially aligned with the open end of a respective one of the tubes 25 of the housing 21. The hub portion 13 is provided with a central aperture 15 configured to receive the upper end of the existing steering column shaft 16. The threaded end 16A of the steering column shaft 16 extends through the aperture 34 in the rear wall 33 of the cup-shaped member 31. A nut 35 is installed on the threaded end 16A of the steering column shaft 16 to secure the housing 21 and steering wheel 10 to the steering column shaft.

As seen in FIG. 5, a cylindrical safety plug 36 having a centrally mounted key lock 37 is removably received in the open top end of the cup-shaped member 31. The key lock 37 has radially extensible lock pins 38 that extend through apertures in the plug 36 and are received in the apertures 32 of the cup-shaped member 31 when a key is inserted into the lock and turned to extend the pins 38 and thereby secure the plug 36 and lock 37 in the cup-shaped member. The safety plug 36 when locked in the cup-shaped member 31 securely encloses, and prevents unauthorized access to the nut 35 at the upper end of the steering column shaft 16. Thus, even if the steering wheel 10 is cut or destroyed, access to the steering wheel attachment nut 35 is prevented, and the integrity of the anti-theft device in maintained.

Figure 6:
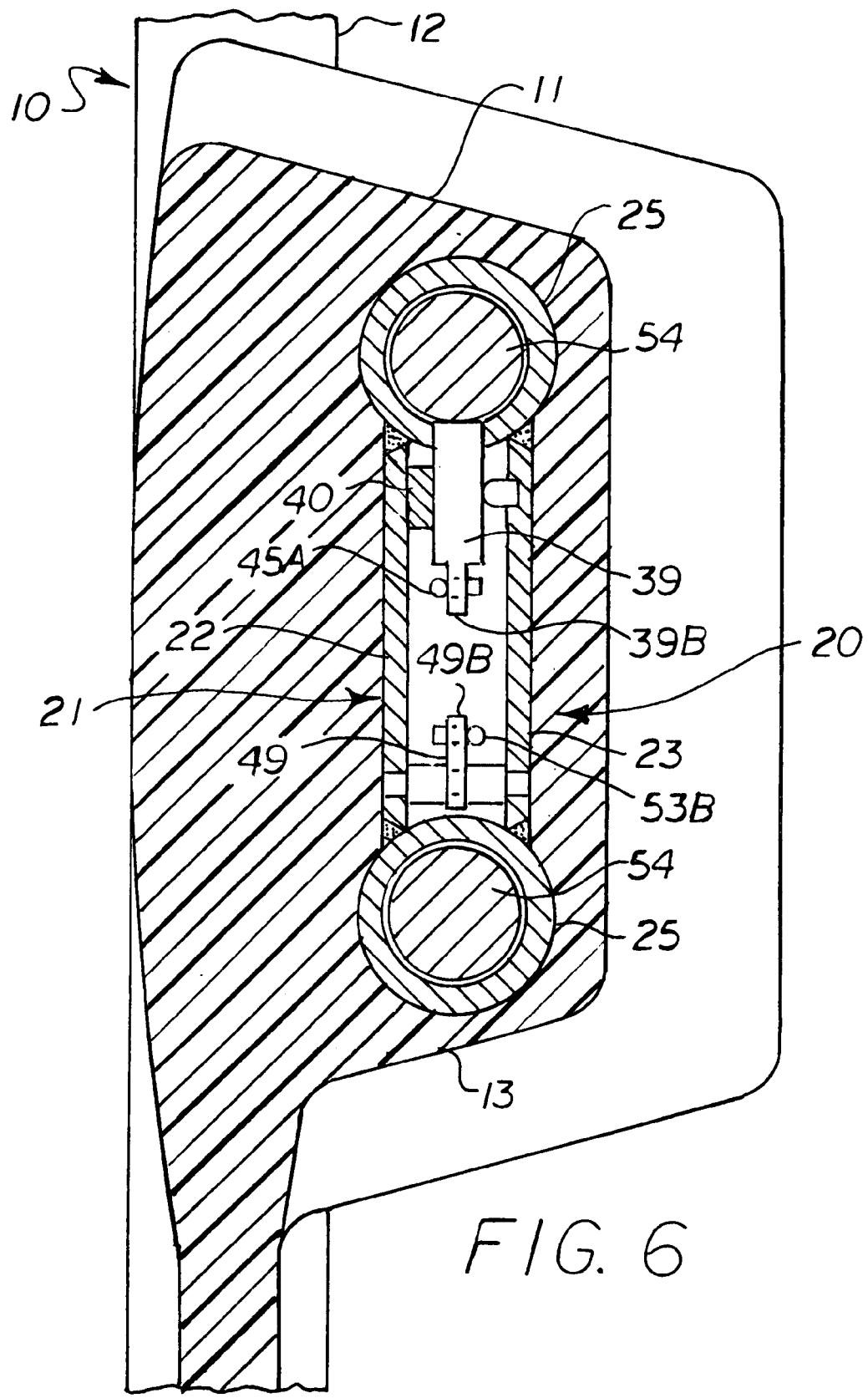
FIG. 6 is a transverse cross section through the anti-theft device taken along line 6—6 of FIG. 3, showing the security rod latch and bell crank mechanisms.

Referring to FIGS. 3, 4 and 6, latch members 39 are pivotally mounted in respective latch retainer blocks 40 disposed inside the housing 21 inwardly adjacent to each of the slots 29 of the tubes 25 and each latch has a dog portion 39A extensible outwardly through a respective slot 29 and an inward facing lever arm portion 39B for effecting pivotal movement about a pivot heel portion 39C. A compression spring 41 disposed between a detent pin support block 42 in the housing 21 and each latch member 39 urges the dog portion 39A of each latch member into a normally outward spring biased position toward a respective security rod member 54 (described hereinafter).

As seen in FIGS. 1 and 3, a generally cylindrical key lock 43 is secured to the front plate 22 of the housing 21 with its front surface generally flush with the front surface of the transverse body portion 11 of the steering wheel 10 and rear portion and lever arm 43A disposed within the housing. A generally rectangular latch linkage arm 44 is pivotally mounted approximately intermediate its ends in the housing 21 laterally adjacent to the key lock 43.

The lever arm portion 39B of one latch member 39 is connected to a first end of the latch linkage arm 44 by a first latch link rod 45A, and the lever arm portion 39B of the other latch member 39 is connected to a second end of the latch linkage arm 44 by a second latch link rod 45B. The lever arm 43A of the key lock 43 is connected to the second end of the latch linkage arm 44 by a latch link rod 46 which is received in a slotted aperture 43B in the outer end of the lever arm. When a key is inserted into the key lock 43 and rotated to the unlocked position, the key lock lever arm 43A rotates and rotary motion is transferred through the latch link rod 46 to pivot the latch linkage arm 44. When the latch linkage arm 44 pivots, it pulls the first and second latch link rods 45A and 45B which pivots the lever arm portion 39B of each latch member 39 inwardly to retract the dog portion 39A of each latch member inwardly against the force of the compression spring 41.

The only function of the key lock 43 is to retract the latch members 39 inwardly so that the security rods (described hereinafter) can be released. Because the latch link rod 46 is connected in a slotted aperture in the outer end of the key lock lever arm 43A, it is not required to unlock the key lock 43 in order to allow the latch members 39 to assume their spring biased position against the surface of the security rods. The compression spring 41 will automatically bias them outwardly and cause the latch link rod 46 to slide in the slotted aperture 43B at the outer end of the key lock lever arm 43A. In a preferred embodiment, the key lock 43 in the housing 21 and the key lock 37 in the safety plug 36 operate with the same key.

As best seen in FIGS. 3 and 4, a retractable detent pin 47 having a shank portion 47A slidably piloted in each of the detent pin support blocks 42 is disposed inwardly adjacent to each of the holes 30 of the tubes 25 and each has a shouldered nose portion 47B extending retractably through a respective hole 30, and a circumferential groove 47C inwardly of the shouldered nose portion. A compression spring 48 surrounding the shank 47A of each detent pin 47 has one end engaged on the detent pin support block 42 and its other end engaged with the detent pin 47 behind the groove 47C and urges the shouldered nose portion 47B of each detent pin into a normally outward spring biased position. Referring additionally to FIG. 6, an L-shaped bell crank 49 is pivotally mounted in the housing 21 adjacent to each detent pin 47 and each has a first leg 49A engaged in the groove 47C of a respective detent pin.

As seen in FIGS. 2, 3, 4, 7 and 8, a security rod release button 50 is slidably mounted through the rear plate 23 of the housing 21 with its rear end extending outwardly of the back end of the hub portion 13 of the steering wheel 10. The security rod release button 50 has a conical nose portion 50A and an elongate shank portion 50B at its forward end. A compression spring 51 surrounds the shank portion 50B and has one end engaged behind the nose portion 50A and its opposed end engaged on the front plate 22 of the housing 21 to urge the security rod release button 50 into a normally outward spring biased position. The security rod release button 50 is contained within the housing 21 by a radial shoulder 50C beneath its conical nose portion 50A.

A generally rectangular detent pivot arm 52 is pivotally mounted intermediate its first and second ends in the housing 21 laterally adjacent to the forward end of the security rod release button 50. The first end of the detent pivot arm 52 has an arcuate cutout portion with a tapered surface 52A that rides on the conical nose portion 50A of the security rod release button 50.

The detent pivot arm 52 is connected above its pivot point to the second leg 49B of one bell crank 49 by a first bell crank link rod 53A, and connected below its pivot point to the second leg 49B of the other bell crank 49 by a second bell crank link rod 53B. When the security rod release button 50 is pressed inwardly to the released position, the conical nose portion 50A of the button moves relative to the detent pivot arm 52 and the tapered surface 52A of the nose portion moves laterally outward to pivot the detent pivot arm 52. The pivotal motion of the detent pivot arm 52 is transferred through the bell crank link rods 53A and 53B which pull them inwardly to pivot the bell cranks 49. When the bell cranks 49 pivot they retract the shouldered nose portion 47B of the detent pins 47 inwardly against the force of the compression spring 48.

As seen in FIGS. 3 through 9, an elongate security rod 54 is slidably mounted in each tube 25. In a preferred embodiment, the security rods 54 are solid rods formed of 8620 steel which is known as a carburized grade material and, when heat treated, offers a file-hard exterior surface and a high-strength, but ductile, core. The file-hard exterior surface prevents saw cutting by a hacksaw, and will dull the cutting blades of a bolt cutter. The ductile core will prevent brittle fracture if a vandal attempts to break off the extended ends of the rods. Each security rod 54 has an enlarged diameter portion 54A at one end which is larger in diameter than the reduced diameter bore 28 at the open end of the tube 25 to prevent removal of the security rods 54 from the tubes 25 (FIG. 4). Each enlarged diameter portion 54A has a circumferential groove 54B located to become positioned adjacent to the hole 30 in the respective tube 25 to receive the shouldered nose portion 47B of the detent pin 47 when the security rod 54 is in the fully retracted position and to become positioned adjacent to the slot 29 in the tube to receive the dog portion 39A of the latch member 39 when the security rod is in the fully extended position. Preferably, the opposed facing surfaces of the dog portions 39A and grooves 54B are configured with a reverse angle which causes the latch member 39 to be pulled against the bottom of the groove during any attempt to force the security rod 54 into the tube 25.

In the fully retracted position (FIG. 3), the enlarged diameter ends 54A of the security rods 54 are engaged on the compression springs 27 and maintained in a spring biased condition by the nose portions 47B of the detent pins 47 engaged in the grooves 54B. In the fully extended position (FIGS. 4 and 9), the enlarged diameter end 54A of the security rods 54 are engaged on the shouldered reduced bore 28 at the open end of the tubes 25 with the remaining elongate portion of the rods extending laterally outward from the steering wheel hub 13 in opposed relation and are latched in the extended condition by the dog portions 39A of the spring biased latch members 39 engaged in the grooves 54B of the rods.

OPERATION

As discussed above, anti-theft device 20 is disposed in the transverse body portion 11 of the steering wheel 10 underneath the conventional airbag assembly and/or horn switch assembly and the hub portion 13 of the steering wheel 10 is molded or otherwise formed around the housing 21 of the anti-theft device 20 such that the device and the steering wheel are substantially an integral unit. When the steering wheel equipped with the anti-theft device is installed on the steering column shaft 16, a nut 35 is installed on the threaded end 16A of the steering column shaft 16 to secure the housing 21 and steering wheel 10 to the steering column shaft (FIG. 5). The safety plug 36 with the key lock 37 is locked in the top end of the cup-shaped member 31 to securely enclose and prevent unauthorized access to the nut 35 at the upper end of the steering column shaft 16. Thus, even if the steering wheel 10 is cut or destroyed, access to the steering wheel attachment nut 35 is prevented, thereby maintaining integrity of the anti-theft device 20.

During normal driving conditions, the security rods 54 of the anti-theft device 20 are in the fully retracted position as shown in FIG. 3. In the fully retracted position, the security rods 54 are positioned with their enlarged diameter ends 54A engaged on the compression springs 27 and the rods 54 are maintained in a spring biased condition by the nose portions 47B of the detent pins 47 engaged in grooves 54B of the rods. In the rod-retracted position, the latch members 39 are in a retracted unlatched position with their dog portions 39A biased against the exterior of the security rods 54 by the compression springs 41.

As shown in FIGS. 3, 4 and 9, when it is desired to secure the vehicle, the security rod release button 50 extending from the rear of the hub portion 13 of the steering wheel 10 (FIG. 2) is manually depressed causing the conical nose portion 50A of the button to pivot the detent pivot arm 52. The pivotal motion is transferred through the bell crank link rods 53A and 53B to pull them inwardly to pivot the bell cranks 49 which retracts the nose portion 47B of the detent pins 47 inwardly against the force of the compression springs 48 to release the nose portion of the detent pins from their engaged position in the grooves 54B of the security rods 54. When the detent pins 47 are retracted the compression springs 27 eject the security rods 54 a short distance outwardly from the tubes 25 and hub portion 13 of the steering wheel 10.

The extended ends of the security rods 54 are then manually pulled further outwardly to their fully extended and latched position. In the fully extended and latched position (FIGS. 4 and 9), the enlarged diameter end 54A of the security rods 54 are engaged on the shouldered reduced bore 28 at the open end of the tubes 25 with the remaining elongate portions of the rods extending laterally outward from the steering wheel hub 13 in opposed relation. When the rods 54 are fully extended, the dog portions 39A of the latch members 39 are automatically forced into engagement in the grooves 54B of the rods by the compression springs 41. The detent pins 47 are forced to their outwardly extended position by the compression springs 48.

Unlike some of the prior art devices, it is not necessary to lock the security rods in their extended position. They are automatically latched in the extended position when pulled outwardly to their fully extended position. When the key lock lever arm 43A is in the locked position, it prevents movement of the latch link rod 46, latch linkage arm 44, latch link rods 45A, 45B, and the latch members 39. The dog portions 39A of the latch members 39 are locked in engagement in the grooves 54B of the security rods 54 to maintain the security rods in the extended position.

When it is desired to unlock the anti-theft device and retract the security rods 54, the key is inserted into the key lock 43 and rotated to the unlocked position. When the key lock lever arm 43A is rotated to the unlocked position, the rotary motion is transferred through the latch link rod 46 to pivot the latch linkage arm 44. When the latch linkage arm 44 pivots, it pulls the first and second latch link rods 45A and 45B which pivots the lever arm portion 39B of each latch member 39 inwardly to retract the dog portion 39A of each latch member inwardly against the force of the compression spring 41. The extended ends of the security rods 54 are then manually pressed inwardly to engage their enlarged diameter ends 54A on the compression springs 27 and compress them. As the enlarged diameter end 54A of each security rod 54 contacts the nose portion 47B of the detent pin 47, the nose portion rides along the exterior of the rod and retracts inwardly against the force of the compression spring 48 and then snaps outwardly into engagement with the rod groove 54B as it becomes positioned adjacent to the detent pin to maintain the respective security rods in the fully retracted position.

It should be noted that the only function of the key lock 43 is to retract the latch members 39 inwardly so that the security rods 54 can be released. Because the latch link rod 46 is connected in a slotted aperture in the outer end of the key lock lever arm 43A, it is not required to unlock the key lock 43 in order to allow the latch members 39 to assume their spring biased position against the surface of the security rods 54. The compression spring 41 will automatically bias them outwardly and cause the latch link rod 46 to slide in the slotted aperture 43B at the outer end of the key lock lever arm 43A.

While this invention has been described fully and completely with special emphasis upon a preferred embodiment, it should be understood that within the scope of the appended claims the invention may be practiced otherwise than as specifically described herein.

What is claimed is:

1. An anti-theft steering wheel assembly, comprising:
   a rotatable steering wheel shaft having an upper end;
   a steering wheel having a central transverse hub portion surrounded by an annular ring portion;
   a generally rectangular metal housing in said transverse hub portion disposed below the plane of said annular ring portion;

said housing secured to said steering wheel shaft upper end to rotate therewith and having at least one longitudinal tubular passageway therein;

a metal security rod telescopically mounted in said tubular passageway movable between a fully retracted position within said tubular passageway and a fully extended position with a portion extending radially outward from either side of said steering wheel hub portion a sufficient distance beyond said annular ring portion to obstruct and prevent effective rotation of said steering wheel;

first latch means in said housing movable between a latched position engaged with said security rod to maintain said security rod in said fully retracted position and an unlatched position disengaged from said security rod;

a rod release button operatively connected with said first latch means and having a portion protruding from a surface of said steering wheel transverse hub portion for moving said first latch means between said latched and unlatched positions;

second latch means in said housing movable between a latched position engaged with said security rod to maintain said security rod in said fully extended position and an unlatched position disengaged therefrom to allow retraction of said security rod;

key lock means operatively connected with said second latch means and having a key receiving portion on a surface of said steering wheel transverse hub portion for receiving a key to move said second latch means to said unlatched position to allow retraction of said security rod.

2. The anti-theft steering wheel assembly according to claim 1, wherein said steering wheel transverse hub portion substantially encloses said housing and has an aperture aligned with said tubular passageway to allow extension and retraction of said security rod therethrough.

3. The anti-theft steering wheel assembly according to claim 1, wherein said housing is secured to said steering wheel shaft upper end to rotate therewith by fastener means disposed inside said housing and connected therebetween; and removable cover means associated with said housing to enclose said fastener means and prevent access to said fastener means.

4. The anti-theft steering wheel assembly according to claim 3, further comprising:

second lock means on said cover means having a key receiving portion for receiving a key to lock said cover means to said housing to prevent unauthorized removal thereof and unauthorized access to said fastener means.

5. The anti-theft steering wheel assembly according to claim 1, wherein said housing has a pair of said longitudinal tubular passageways therein disposed in generally parallel spaced relation; and a pair of metal security rods each telescopically mounted in a respective one of said tubular passsageways;

each of said rods movable between a fully retracted position within the respective said tubular passageway and a fully extended position with a portion of each of said rods extending radially outward from laterally opposed sides of said steering wheel transverse hub portion a sufficient distance beyond said annular ring portion to obstruct and prevent effective rotation of said steering wheel.

6. The anti-theft steering wheel assembly according to claim 1, wherein said security rod has a circumferential groove near one end;

said first latch means comprises a spring biased detent pin in said housing movable between a spring biased outwardly extended position engaged with said circumferential groove to maintain said security rod in said fully retracted position;

said rod release button is operatively connected with said detent pin to retract said detent pin from engagement with said groove to its said unlatched position when said button is depressed and to allow said detent pin to assume an outwardly extended spring biased position protruding a short distance into said tubular passageway when said security rod is extended and said button is released; and said detent pin is retracted inwardly by said security rod passing across the protruding portion as said security rod is moved to its said fully retracted position and then snaps back outwardly into engagement with said groove as said groove becomes positioned adjacent to said detent pin to again maintain said security rod in its said fully retracted position.

7. The anti-theft steering wheel assembly according to claim 6, wherein said second latch means comprises a spring biased latch member pivotally mounted in said housing to be movable between a spring biased outwardly extended position against the exterior of said security rod when said security rod is in its said fully retracted position;

said spring biased latch member snapping into engagement with said groove as said security rod is moved to its said fully extended position to lock said security rod in its said fully extended position;

said key lock means is connected with said latch member to retract said latch member and disengage it from said groove when said key is turned to an unlocked position to allow retraction of said security rod; and said latch member again assuming its said spring biased outwardly extended position against the exterior of said security rod when said key is turned to a locked position and said key is removed from said key lock means.

8. An anti-theft device adapted to be installed in a central transverse hub portion of a steering wheel disposed below the plane of a surrounding annular ring portion, the device comprising:

a generally rectangular metal housing adapted to be substantially enclosed in said transverse hub portion of said steering wheel;

said housing adapted to receive and be secured to a steering wheel shaft upper end and to rotate therewith, said housing having at least one longitudinal tubular passageway therein;

a metal security rod telescopically mounted in said tubular passageway movable between a fully retracted position within said tubular passageway and a fully extended position with a portion extending radially outward from either side of said steering wheel transverse hub portion a sufficient distance beyond said annular ring portion to obstruct and prevent effective rotation of said steering wheel;

first latch means in said housing movable between a latched position engaged with said security rod to maintain said security rod in said fully retracted position and an unlatched position disengaged from said security rod;

a rod release button operatively connected with said first latch means and having a portion protruding from a surface of said steering wheel transverse hub portion for moving said first latch means between said latched and unlatched positions;

second latch means in said housing movable between a latched position engaged with said security rod to maintain said security rod in said fully extended position and an unlatched position disengaged therefrom to allow retraction of said security rod; and key lock means operatively connected with said second latch means and having a key receiving portion on a surface of said steering wheel transverse hub portion for receiving a key to move said second latch means to said unlatched position to allow retraction of said security rod.

9. The anti-theft device according to claim 8, wherein said housing is sized and shaped to be substantially enclosed in said steering wheel transverse hub portion with said tubular passageway axially aligned with an aperture in said transverse hub portion to allow extension and retraction of said security rod therethrough.

10. The anti-theft device according to claim 8, wherein said housing is secured to said steering wheel shaft upper end to rotate therewith by fastener means disposed inside said housing and connected therebetween; and removable cover means associated with said housing to enclose said fastener means and prevent access to said fastener means.

11. The anti-theft device according to claim 10, further comprising:

second lock means on said cover means having a key receiving portion for receiving a key to lock said cover means to said housing to prevent unauthorized removal thereof and unauthorized access to said fastener means.

12. The anti-theft device according to claim 8, wherein said housing has a pair of said longitudinal tubular passageways therein disposed in generally parallel spaced relation; and a pair of metal security rods each telescopically mounted in a respective one of said tubular passageways;

each of said rods movable between a fully retracted position within the respective said tubular passageway and a fully extended position with a portion of each of said rods extending radially outward from laterally opposed sides of said steering wheel transverse hub portion a sufficient distance beyond said annular ring portion to obstruct and prevent effective rotation of said steering wheel.

13. The anti-theft device according to claim 8, wherein said security rod has a circumferential groove near one end;

said first latch means comprises a spring biased detent pin in said housing movable between a spring biased outwardly extended position engaged with said circumferential groove to maintain said security rod in said fully retracted position;

said rod release button is operatively connected with said detent pin to retract said detent pin from engagement with said groove to its said unlatched position when said button is depressed and to allow said detent pin to assume an outwardly extended spring biased position protruding a short distance into said tubular passageway when said security rod is extended and said button is released; and said detent pin is retracted inwardly by said security rod passing across the protruding portion as said security rod is moved to its said fully retracted position and then snaps back outwardly into engagement with said groove as it becomes positioned adjacent to said detent pin to again maintain said security rod in its said fully retracted position.

14. The anti-theft device according to claim 13, wherein said second latch means comprises a spring biased latch member pivotally mounted in said housing to be movable between a spring biased outwardly extended position against the exterior of said security rod when said security rod is in its said fully retracted position;

said spring biased latch member snapping into engagement with said groove as said security rod is moved to its said fully extended position to lock said security rod in its said fully extended position;

said key lock means is connected with said latch member to retract said latch member and disengage it from said groove when said key is turned to an unlocked position to allow retraction of said security rod; and said latch member again assuming its said spring biased outwardly extended position against the exterior of said security rod when said key is turned to a locked position and said key is removed from said key lock means.

* * * * *